June 23, 1936.  A. H. REYNOLDS  2,045,335
TANNIN BRIQUETTE CONTAINING A RETARDING AGENT
Filed Jan. 22, 1934
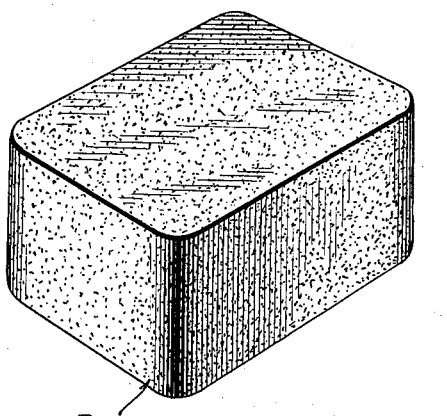
BRIQUETTE CONTAINING A
TANNIN COMPOUND AND
A RETARDING AGENT.
Inventor,
Albert H. Reynolds,
By Ivan P. Tashof,
Attorney Patented June 23, 1936

2,045,335

UNITED STATES PATENT OFFICE 2,045,335

TANNIN BRIQUETTE CONTAINING A RETARDING AGENT

Albert H. Reynolds, Chicago, Ill., assignor to Dearborn Chemical Company, Chicago, Ill., a corporation of Illinois Application January 22, 1934, Serial No. 707,796

7 Claims. (Cl. 210—23)

The present invention relates to a composition of matter for the treatment of water, and more particularly, boiler feed water.

Boiler feed water contains salts of lime and magnesium in solution which in course of time form a scale on the surfaces of the boiler unless the water is treated. It is quite common to add tannin compounds or tannin extracts to the feed water to prevent the growth of calcium sulfate and calcium carbonate crystals and/or magnesium sulfate and magnesium carbonate crystals, and the tannin extract is quite frequently added in the form of a briquette. These tannin briquettes under normal operating conditions tend to dissolve too rapidly to permit them performing their intended function.

It has been found that the rate of solution of the tannin extract and the briquette containing the same may be retarded by incorporating in the briquette a suitable solution-retarding agent. It has further been found that the rate of solution of the briquette may be controlled by the amount of retarding agent added, the rate of solution of the briquette varying inversely with the amount of retarding agent used. This is, of course, a decided advance in the art, as it enables the preparation of a briquette having a predetermined rate of solution adjusted in accordance with the particular characteristics of the water treated.

In practicing the present invention, the tannin compound, for example, powdered chestnut oak tannin extract, is mixed with a retarding agent and a small amount of water. The retarding agent is preferably an alkaline earth compound which will react with a small portion of the tannin to form a slightly soluble compound or salt. The preferred retarding agent is hydrated lime. This may be added in the form of a hydrated lime or the tannin extract may have mixed therewith calcium oxide or quicklime in the presence of a sufficient quantity of water to form the hydrated lime in situ.

In preparing the briquettes, the ingredients thereof are mixed in a horizontal closed mixer together with the amount of water necessary to act as a binder. While the hydrated lime is preferably added to the tannin extract prior to the addition of the water, it may be added subsequent thereto. The tannin extract and retarding agent are preferably ground to pass a 100 mesh sieve before being mixed. However, it is obvious that under some circumstances, the tannin extract and/or hydrated lime may be ground considerably coarser. After mixing as set forth, the mixture is fed into a press, and briquettes of uniform size and weight are formed under exceedingly high pressure, preferably in the neighborhood of 10,000 pounds per square inch. The size of each briquette of course determines its weight, and the latter may vary from one to four pounds depending upon the size of the briquette.

The following are illustrative examples of mixtures containing the retarding agent, the mixtures being adapted to be formed into briquettes in the manner set forth.

|  | Per cent |
|---|---|
| (1) Powdered chestnut oak tannin extract | 94.75 |
| Hydrated lime | .25 |
| Water | 5.00 |
|  | 100.00 |

|  | Per cent |
|---|---|
| (2) Powdered chestnut oak tannin extract | 92.50 |
| Hydrated lime | 2.50 |
| Water | 5.00 |
|  | 100.00 |

|  | Per cent |
|---|---|
| (3) Powdered chestnut oak tannin extract | 90.00 |
| Hydrated lime | 5.00 |
| Water | 5.00 |
|  | 100.00 |

The retarding action of the hydrated lime is due to the formation of a slightly soluble calcium tannate. Calcium, magnesium, strontium and barium compounds or salts which produce corresponding tannates may be substituted for the calcium hydrate. For example, briquettes formed from a mixture of tannin extract and barium or strontium chloride have their rates of solution in water retarded. However, it is preferred to use as the retarding agent calcium hydrate or calcium oxide as experiments show that these agents give the most satisfactory results.

While for most waters it is desired to prepare briquettes containing the tannin extract and from one-quarter of one per cent to five per cent of calcium hydrate, or its equivalent, and about two and one-half per cent gives the best results, it is desired to point out that it is within the province of the present invention to add the calcium hydrate or its equivalent in an amount greater than five per cent depending upon how much it is desired to retard the rate of solution of the resulting briquette. It is recognized that the physical and chemical properties of boiler-feed waters vary to quite a wide degree depending upon their source of origin, and therefore the solubility of the tannin briquette must be adjusted in view thereof. Since it has been ascertained that the rate of solution of the tannin briquette is in inverse proportion to the amount of hydrated lime or its equivalent used, a method is accordingly provided of varying the rate of solution of the tannin briquette by varying the amount of the retarding agent.

It is desired to point out that the addition of an alkaline earth compound to the tannin in the presence of a small amount of water results in the formation of an alkaline earth tannate and this is particularly desirable, since these compounds, and particularly the calcium and magnesium tannates, form in a very flocculent state which enable them to be maintained in suspension in the boiler-feed water, instead of settling to the bottom of the boiler.

A tannin briquette without a retarder, and with just sufficient water to act as a binder, under standardized conditions of tests was found to dissolve in eight hours. A briquette prepared from the same tannin extract and containing the same amount of water but having two and one-half per cent of hydrated lime added thereto was found to dissolve in from twenty-eight to thirty-two hours. Experiments show that briquettes having less than two and one-half per cent of hydrated lime added thereto dissolved in a shorter time, and those having a greater amount of hydrated lime dissolved in a longer period of time.

It is probable that the formation of the slightly soluble tannate of the alkaline earth metal proceeds to a considerable degree during the process of manufacture of the briquette, due to the amount of water added and to the large amount of heat of hydration produced. The balance of the reaction is completed when the briquette is added to the boiler feed water but takes place while the brick is retained as a compact unit due to the fact that there is absorption of moisture or wetting of the briquette extending inside to a depth of about one-half an inch below the surface. This insures reaction going to completion before the briquette has disintegrated.

While in the examples herein set forth the tannin extract used is that prepared from chestnut oak, it is obvious that tannin extracts may be prepared from other well known prior art tannin-containing materials and used in lieu of the chestnut oak extract. The latter, however, is the preferred tannin extract to be used in accordance with the present invention.

The rate of solubility of the tannin briquettes may also be controlled by incorporating therein suitable amounts of casein, agar-agar, starch or aluminum sulfate. However, these compounds do not function as satisfactorily as the alkali earth compounds and particularly the calcium and magnesium compounds.

Briquettes prepared in accordance with the present invention have been used for the treatment of boiler feed water for a considerable period of time and the results have been quite satisfactory.

The accompanying drawing shows a briquette containing a tannin extract and a retarding agent.

What is claimed is:

1. A briquette for the treatment of boiler water containing as its essential ingredients a predominating quantity of a tannin extract and a material to slow up the dissolution of the briquette in the water, said material being the reaction product of a mixture of a tannin compound and an alkaline earth compound, the alkaline earth compound forming between one-fourth of one per cent and about five per cent (5%) of the mixture.

2. A briquette for the treatment of boiler water containing as its essential ingredients a tannin extract and an alkaline earth tannate, the latter being present in a sufficient quantity to slow up the normal rate of dissolution of the briquette in the water, the tannin extract being present in a quantity predominating over the alkaline earth tannate.

3. A briquette for the treatment of boiler water containing as its essential ingredients a tannin extract and a calcium tannate, the latter being present in a sufficient quantity to slow up the normal rate of dissolution of the briquette in the water, the tannin extract being present in a quantity predominating over the calcium tannate.

4. A briquette for the treatment of boiler water containing as its essential ingredients a predominating quantity of a tannin extract and a material present in a sufficient quantity to slow up the dissolution of the briquette in the water, said material being the reaction product of a mixture of a tannin compound and calcium hydrate, the calcium hydrate forming between one-fourth of one per cent and about five per cent (5%) of the mixture.

5. A briquette for the treatment of boiler water containing as its essential ingredients a predominating quantity of a tannin extract and a material present in a quantity sufficient to slow up the dissolution of the briquette in the water, said material being the reaction product of a mixture of tannin and an alkaline earth compound selected from the group consisting of calcium and magnesium compounds and present in the mixture to the extent of at least one-fourth of one per cent.

6. The process of treating boiler feed water comprising adding thereto a briquette having as its essential ingredients a predominating quantity of a tannin extract and an alkaline earth tannate in a sufficient quantity to slow up the dissolution of the briquette in the water.

7. The process of treating boiler feed water comprising adding thereto a briquette having as its essential ingredients a predominating quantity of a tannin extract and calcium tannate in a sufficient quantity to slow up the dissolution of the briquette in the water.

ALBERT H. REYNOLDS.